(12) United States Patent
Kaji

(10) Patent No.: US 7,394,487 B2
(45) Date of Patent: Jul. 1, 2008

(54) IMAGE DATA REDUCING DEVICE, MICRO COMPUTER, AND ELECTRONIC APPARATUS

(75) Inventor: Hidetaka Kaji, Tsukuba (JP)

(73) Assignee: Seiko Epson Corporation, Tokyo (JP)

( * ) Notice: Subject to any disclaimer, the term of this patent is extended or adjusted under 35 U.S.C. 154(b) by 761 days.

(21) Appl. No.: 10/802,938

(22) Filed: Mar. 18, 2004

(65) Prior Publication Data

US 2004/0234164 A1 Nov. 25, 2004

(51) Int. Cl.
*H04N 5/228* (2006.01)
(52) U.S. Cl. .................................. 348/222.1
(58) Field of Classification Search ............... 348/222.1
See application file for complete search history.

(56) References Cited

U.S. PATENT DOCUMENTS 6,754,279 B2 * 6/2004 Zhou et al. ............. 375/240.28

* cited by examiner

*Primary Examiner*—James M. Hannett
(74) *Attorney, Agent, or Firm*—Oliff & Berridge, PLC

(57) ABSTRACT

Aspects of the invention can provide an image data reducing device, a micro computer, and an electronic apparatus that can reduce image data without causing the increase in circuit scale and over spec.

The image data reducing device can include a reduced image data generating circuit to which each component of YUV is input in series and that outputs YUV image data after reduced, and an output control signal generating circuit that generates an output control signal for controlling whether each component of YUV is output or not. The reduced image data generating circuit can include a switching circuit that controls the presence of output for each component of image data input in series based on the output control signal. The output control signal generating circuit can include a counting circuit that counts input of Y component and resets the counted value when the counted value reaches the reciprocal number of reduction ratio, and a decimation pattern information storing unit that stores decimation pattern information set in correlation with the counted value of the Y component. The output control signal generating circuit can generate an output control signal based on the counted value of the Y component and the decimation pattern information.

9 Claims, 12 Drawing Sheets

FIG. 6

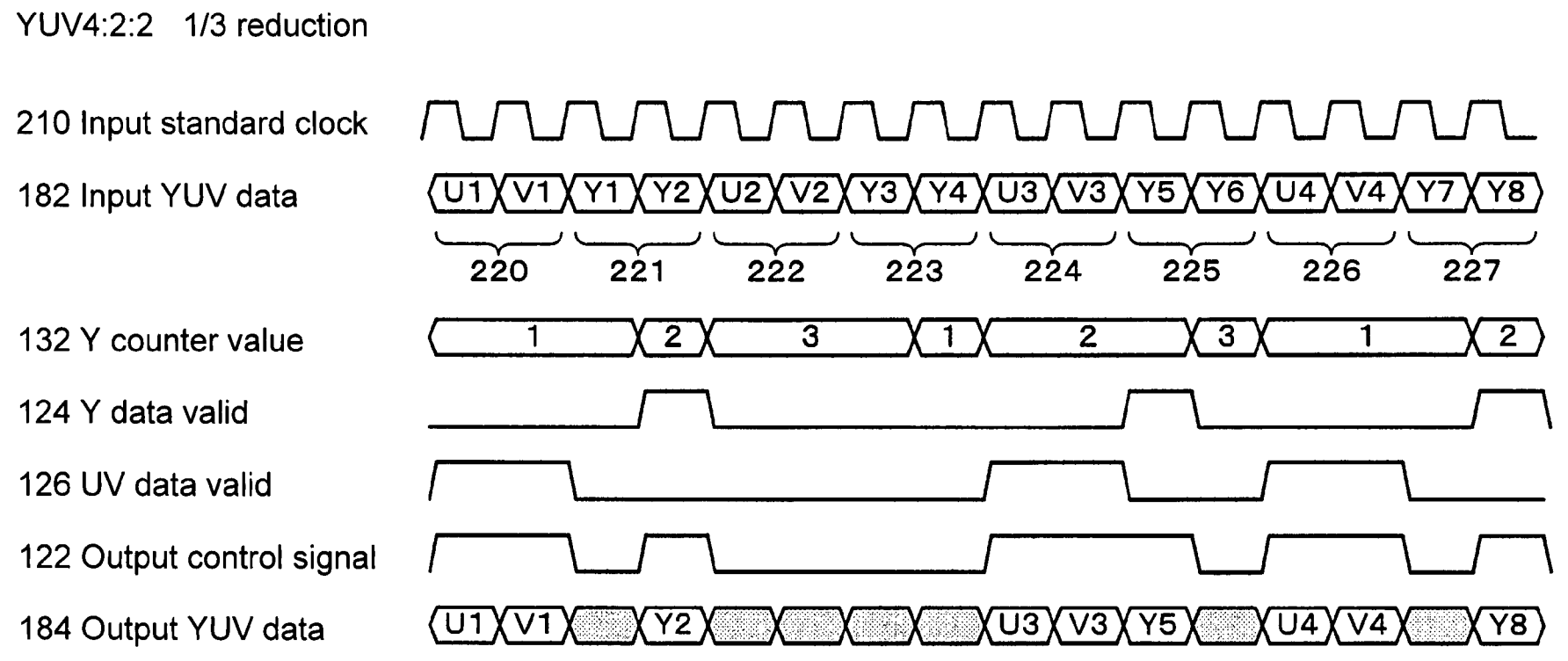

YUV4:2:2  1/3 reduction

210 Input standard clock

182 Input YUV data

132 Y counter value

124 Y data valid

126 UV data valid

122 Output control signal

184 Output YUV data

| YUV format | Reduction ratio | Condition for outputting UV data |
|---|---|---|
| YUV4:4:4 | All Case | When Y data is output |
| YUV4:2:2 | 1/2 | Invariably output |
| | 1/3 | When Y counter is 1 or 2 |
| | 1/4 | When Y counter is 1 |
| | 1/5 | When Y counter is 2 or 3 |
| | 1/6 | When Y counter is 3 |
| | 1/7 | When Y counter is 3 or 4 |
| | 1/8 | When Y counter is 3 |
| YUV4:1:1 | 1/2 | Invariably output |
| | 1/3 | Invariably output |
| | 1/4 | Invariably output |
| | 1/5 | When Y counter is not 4 |
| | 1/6 | When Y counter is not 5 |
| | 1/7 | When Y counter is 1, 2, 3, or 4 |
| | 1/8 | Y counter is 1 |

FIG. 9

IMAGE DATA REDUCING DEVICE, MICRO COMPUTER, AND ELECTRONIC APPARATUS

BACKGROUND OF THE INVENTION

1. Field of Invention

Aspects of the invention relates to an image reducing device, a micro computer, and an electronic apparatus.

2. Description of Related Art

In a cellular phone and so on, for example, when image data whose size is large is received, the image data needs be output after being reduced to a small size for a cellular phone. In this case, conventionally, processing of 1 pixel in 1 cycle has been implemented by performing processing after data is expanded to the bit width of 1 pixel unit. If data is processed after expanding the data to the bit width of 1 pixel unit, however, the processing becomes parallel processing such that gate scale becomes large. Furthermore, in the case where 1 pixel is constituted of, in YUV data and so on, 24 bit (for example, YUV4:4:4), 32 bit (for example, YUV4:2:2), 48 bit (for example, YUV4:1:1), and so on, there has been a problem that it becomes over spec in the case where 24 bit is used as bandwidth of reduction processing.

Aspect of, the invention are intended to provide an image data reducing device, a micro computer, and an electronic apparatus that can reduce image data without causing the increase in circuit scale and over spec.

SUMMARY OF THE INVENTION

One aspect of the invention is an image data reducing device for image data composed of a plurality of components, the image data having data corresponding one-to-one to each pixel with respect to a given component among the plurality of components, and having data common to a plurality of pixels with respect to the other components. The image data reducing device can include a reduced image data generating circuit receiving image data that is input so that data of each component has a series relationship with each other, and generating image data after reduced so as to output the image data after reduced; and an output control signal generating circuit generating an output control signal for controlling whether each component of input image data is output or not based on a decimation pattern of input component that is determined depending on a format of input image data and reduction ratio. The reduced image data generating circuit can include a switching circuit controlling the presence of output for each component of image data input in series based on the output control signal.

Image data input so that data of each component has a series relationship with each other can mean that, in the case where image data is composed of a first component, and a second component for example, the first and second components are not input in parallel. In the case where each of the first and second components is represented by data of n-bit for example, therefore, the first component with bandwidth of n-bit is input with a bus of n-bit first, and thereafter the second component with bandwidth of n-bit is input. Thereby data of each component is input in a manner of having a series relationship with each other.

Processing can be implemented with receiving the n-bit data in parallel in 1 cycle. Furthermore, for example, the case where image data is received as serial data of 1 bit, or data with bandwidth that is equal to or smaller than the bit width of each component, is also within the scope of the exemplary embodiment. In this case, unit of data control may be changed depending on the bandwidth.

For example, the case where a first component of n-bit is input with a 1 bit serial line and then a second component of n-bit is input, and thereby data of each component is input in a manner of having a series relationship with each other, may be available. Since the decimation pattern of input component is unambiguously determined depending on a format of image data and reduction ratio, a plurality of patterns depending on the format of image data and reduction ratio may be set previously, and the patterns may be selected and used depending on the format of input image data and reduction ratio.

In the case where the format of input image data and reduction ratio are fixed, only decimation patterns corresponding to the fixed details may be set. According to aspects of the invention, the output control signal can be generated in accordance with the decimation pattern, and the presence of output can be controlled for each component of image data in accordance with the output control signal. Accordingly, the image data reducing device capable of reducing image data without causing the increase in circuit scale and over spec can be provided.

In the image data reducing device, the output control signal generating circuit can include a counting circuit counting input of the given component, and resetting counted value in the case where the counted value reaches the reciprocal number of the reduction ratio so as to restart counting, based on information about the format of image data and information about the reduction ratio, and a decimation pattern information storing unit storing decimation pattern information set in correlation with the counted value of the given component. The output control signal is generated based on the counted value of the given component and the decimation pattern information. By defining the decimation pattern in correlation with the counted value of the given component corresponding one-to-one to each component, the need to count the other components is eliminated such that the increase in circuit scale can be prevented.

An image data reducing device of another aspect of the invention that reduces YUV image data can include a reduced image data generating circuit receiving image data that is input so that data of each component of YUV has a series relationship with each other, and generating YUV image data after reduced so as to output the YUV image data after reduced; and an output control signal generating circuit generating an output control signal for controlling whether each component of YUV of input image data is output or not based on a decimation pattern of input component that is determined depending on a format of input YUV image data and reduction ratio. The reduced image data generating circuit can include a switching circuit controlling the presence of output for each component of image data input in series based on the output control signal. The output control signal generating circuit can include a counting circuit counting input of Y component, and resetting counted value in the case where the counted value reaches the reciprocal number of the reduction ratio so as to restart counting, based on information about the format of image data and information about the reduction ratio, and a decimation pattern information storing unit storing decimation pattern information set in correlation with the counted value of the Y component. The output control signal is generated based on the counted value of the Y component and the decimation pattern information.

In the image data reducing device, the reduced image data generating circuit can include a common data storing unit retaining the other components or UV component that is input and has data common to a plurality of pixels. The reduced image data generating circuit generates reduced image data by using data stored in the common data storing unit based on the output control signal. The output control signal generating circuit determines whether reduced image data is generated by using data stored in the common data storing unit or not, based on the counted value of the Y component and the decimation pattern information, the output control signal generating circuit generating the output control signal directing to generate reduced image data by using data stored in the common data storing unit in the case where generating of reduced image data by using data stored in the common data storing unit is determined.

In the image data reducing device, input data is received as parallel data with bandwidth equal to a bit number of each component. The reduced image data generating circuit controls the presence of output for each bit of the parallel data base on the output control signal.

In the image data reducing device, a reduction ratio setting register setting reduction ratio information is included. Reduction ratio is determined based on the reduction ratio information set in the reduction ratio setting register.

The image data reducing device, a format information setting register setting format information of input image data is included. A format of input image data is determined based on the format information set in the format information setting register.

A micro computer of another aspect of the invention can include any of the above described image data reducing devices.

An electronic apparatus of another aspect of the invention can include the above described micro computer; input device for data to be processed by the micro computer; and LCD output device for outputting data that has been processed by the micro computer.

BRIEF DESCRIPTION OF THE DRAWINGS

FIG. 6 is a timing chart diagram for the case where image data format information is YUV 4:2:2, and reduction ratio is 1/3;

FIG. 9 is a diagram showing an output pattern regarding Y counter value and output UV component by each YUV format and each reduction ratio;

DETAILED DESCRIPTION OF PREFERRED EMBODIMENTS

Exemplary embodiments of the invention will be described in detail below with reference to drawings.

Figure 1A:
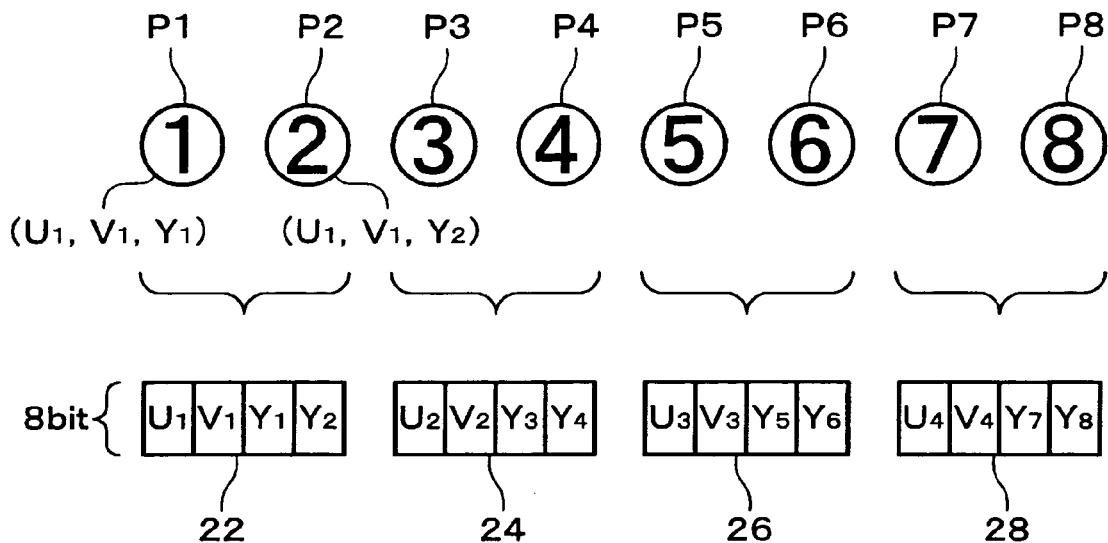
FIGS. 1(A) and (B) are diagrams for explaining image data reducing and a format of image data used in an exemplary embodiment.
Figure 1B:
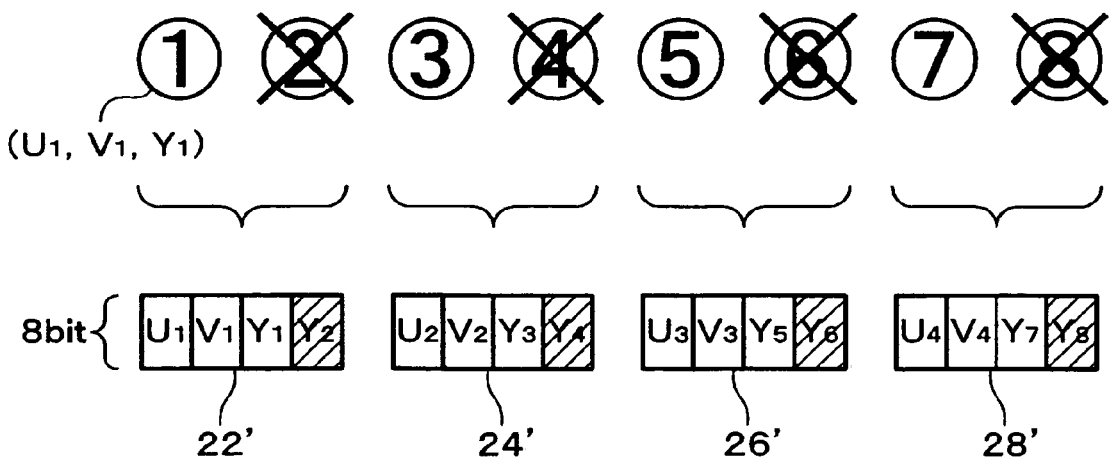

FIGS. 1 (A) and (B) are diagrams for explaining image data reducing and a format of image data used in the present embodiment. Here, the case of reducing image data having a format of YUV4:2:2 will be described by way of example. YUV image data is image data in which the pixel information of a pixel is expressed with each component of YUV. References P1 through P8 of FIG. 1 (A) indicate each pixel corresponding to image data input to an image data reducing device of the present embodiment. Reference 22 indicates the configuration of image data for the pixels P1 and P2, reference 24 that of image data for the pixels P3 and P4, reference 26 that of image data for the pixels P5 and P6, and reference 28 that of image data for the pixels P7 and P8.

In the case of image data having a format of YUV4:2:2, for example, the image data 22 for the pixels P1 and P2 includes U1, V1, Y1, and Y2. Here, it is assumed that the YUV data has a format of a type where UV component is prior to Y component. The pixel data for P1 is (U1, V1, Y1), and the pixel data for P2 is (U1, V1, Y2). As described, in the case of YUV4:2:2, Y component has data corresponding one-to-one to each pixel, and UY component is shared by the adjacent two pixels. It is assumed that each component data is represented by 8 bit.

In the embodiment, data of each component of YUV is input in a manner of having a series relationship with each other as shown with references 22, 24, and so on. For example, in the case where each component of YUV is represented by data of 8 bit as shown with references 22, 24, and so on, data of each component of YUV is input in a manner of having a series relationship with each other by being input as data of 8 bit bandwidth with a bus of 8 bit. In this case, processing can be implemented with receiving 8 bit data in parallel in 1 cycle. For example, however, the case where image data is received as serial data of 1 bit, or data with bandwidth that is equal to or smaller than the bit width of each component, is also within the scope of the embodiment. In this case, unit of data control may be changed depending on the bandwidth.

FIG. 1 (B) is a diagram for explaining data decimation for the case of implementing 1/2 reduction for input image data. The 1/2 reduction means that 1/2 of pixels data is input are left and the remaining 1/2 thereof are decimated. Here, shown is the state where the pixels P1, P3, P5, and P7 are left, and the pixels P2, P4, P6, and P8 are decimated. In this case, the image data after reduced corresponding to the pixels are indicated with references 22', 24', and so on. Namely, components shown as a hatched area are decimated. For example, in reference 22', the data (U1, V1, Y1) for the pixel P1 remaining after reduction is not decimated so as to be output, and the data Y2 for the pixel P2 eliminated after reduction is decimated.

In the case of 1/2 reduction of image data having a format of YUV4:2:2, the whole decimation pattern becomes the repetition of the decimation pattern 22' of two pixels P1 and P2. Namely, with respect to Y component, data is output if reminder obtained by dividing n of Yn by 2 is equal to the value of a representative point (here, 1, since the value of a representative point is defined as 1), and data is decimated in the other case. Meanwhile, UV component is output always (decimation pattern for the case of ½ reduction of image data having a format of YUV4:2:2).

The above decimation pattern can also be defined as being related to Y counter value. Namely, with respect to Y component, data is output if Y counter value is equal to the value of a representative point (here, 1, since the value of a representative point is defined as 1), and data is decimated in the other case. Meanwhile, UV component is output regardless of the Y counter value (decimation pattern related to Y counter value for the case of ½ reduction of image data having a format of YUV4:2:2).

Here, image data used in the present embodiment is not limited to YUV image data. For example, the embodiment can apply to image data that is formed of a plurality of components as with YUV, and that has data corresponding one-to-one to each pixel as with Y component, for example, with respect to a given component among the plurality of components, and has data common to a plurality of pixels as with UV component, for example, with respect to the other components.

Figure 2:
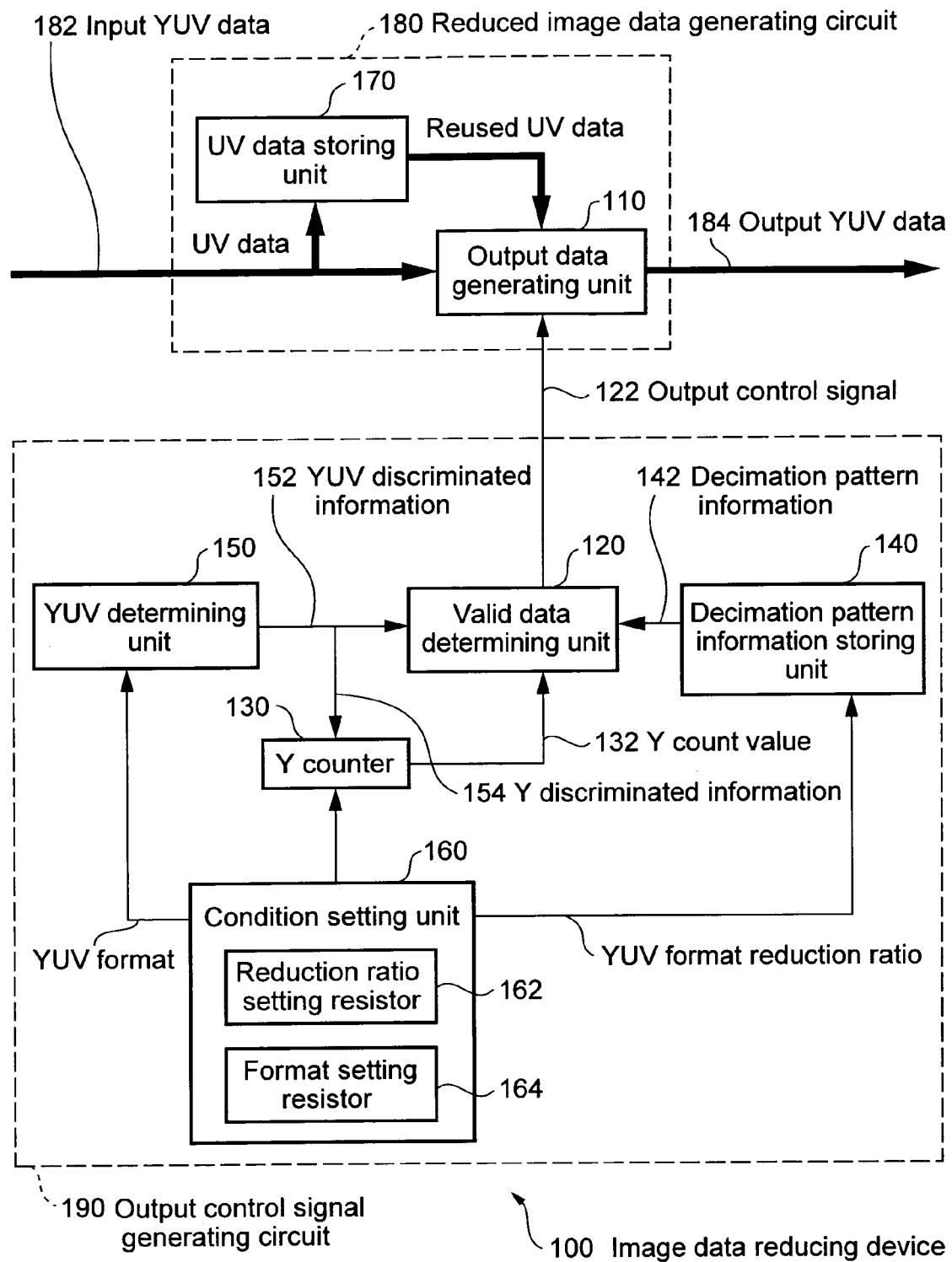
FIG. 2 is one example of a block diagram of an image data reducing device of an exemplary embodiment.

FIG. 2 is one example of a block diagram of an image data reducing device of the present embodiment. An image data reducing device 100 of the exemplary embodiment can include a reduced image data generating circuit 180, and an output control signal generating circuit 190. The reduced image data generating circuit 180 receives image data (input YUV data 182) input so that data of each component has a series relationship with each other, so as to generate image data after reduced (output YUV data 184) and output it. The output control signal generating circuit 190 generates an output control signal 122 for controlling whether each component of input image data is output or not based on decimation pattern of input components that is determined depending on a format of input image data (the input YUV data 182) and reduction ratio. The reduced image data generating circuit 180 may include a switching circuit controlling the presence of output for each component of the image data 182 input in series based on the output control signal 122.

Meanwhile, the output control signal generating circuit 190 may include a counting circuit (a Y counter 130), and a decimation pattern information storing unit 140. The counting circuit counts input of the given component, and resets the counted value when the counted value reaches the reciprocal number of reduction ratio so as to restart counting, based on the information about the image data format and reduction ratio. The decimation pattern information storing unit 140 stores the counted value of the counting circuit (the Y counter 130), and decimation pattern information set in correlation with the counted value of the given component. The output control signal generating circuit 190 may generate the output control signal 122 based on the counted value of the given component and the decimation pattern information.

In the case of the image data reducing device 100 that reduces YUV image data, the image data reducing device 100 may include the reduced image data generating circuit 180 that receives the image data 182 input so that data of each component of YUV has a series relationship with each other, so as to generate YUV image data after reduced and output it. Furthermore, the image data reducing device 100 may include the output control signal generating circuit 190 that generates the output control signal 122 for controlling whether each component of YUV of input image data is output or not based on decimation pattern of input components that is determined depending on a format of input YUV image data and reduction ratio.

The reduced image data generating circuit 180 may include a switching circuit controlling the presence of output for each component of the image data input in series based on the output control signal 122.

Meanwhile, the output control signal generating circuit 190 may include a counting circuit (the Y counter 130) that counts input of Y component, and resets the counted value when the counted value reaches the reciprocal number of reduction ratio so as to restart counting, based on the information about the image data format and reduction ratio. In addition, the output control signal generating circuit 190 may include the decimation pattern information storing unit 140 that stores decimation pattern information set in correlation with the counted value of the Y component. The output control signal generating circuit 190 may generate the output control signal 122 based on the counted value of the counting circuit (the Y counter 130) and the decimation pattern stored in the decimation pattern information storing unit 140.

The reduced image data generating circuit 180 may include a common data storing unit (a UV data storing unit 170) retaining the other components or UV component that is input and has data common to a plurality of pixels, and may generate reduced image data by using data stored in the common data storing unit (the UV data storing unit 170) based on the output control signal 122. The output control signal generating circuit 190 may determine whether reduced image data is generated by using data stored in the common data storing unit or not, based on the counted value of the Y component and the decimation pattern information. Then, in the case where generating of reduced image data by using data stored in the storing unit is determined, the output control signal generating circuit 190 may generate the output control signal 122 directing to generate reduced image data by using data stored in the common data storing unit.

The input data 182 may be received as parallel data with bandwidth equal to bit number of each component. In this case, the reduced image data generating circuit 180 controls the presence of output for each bit of the parallel data base on the output control signal 122. In addition, a reduction ratio setting register 162 that sets reduction ratio information may be included, and reduction ratio may be determined based on the reduction ratio information set in the reduction ratio setting register 162. Furthermore, a format information setting register 164 that sets format information of input image data may be included, and a format of input image data may be determined based on the format information set in the format information setting register 164.

A unit for setting/changing reduction ratio information (a condition setting unit 160) may be included. For example, the condition setting unit 160 may set reduction ratio information in the reduction ratio setting register 162 based on external input and so on.

A unit (the condition setting unit 160) for setting/changing image data format information (for example, YUV information) may be included. For example, the condition setting unit 160 may set image data format information (for example, YUV information) in the format information setting register 164 based on external input and so on.

A YUV determining unit 150 may be provided in the output control signal generating circuit 190, and processing for determining which component among YUV input data to be processed is, based on image data format information set in the format information setting register 164, and thereby YUV discriminated information 152 may be output based on the determination result.

The Y counter 130 can be constituted so that it counts input of Y component, and resets the counted value when the counted value reaches the reciprocal number of reduction ratio so as to restart counting based on Y discriminated information 154 among the YUV discriminated information 152, and reduction ratio information set in the reduction ratio setting register 162.

The decimation pattern information storing unit 140 may be provided in the output control signal generating circuit 190, and may store information about decimation pattern that is specified with image data format and reduction ratio with relating the information with image data format and reduction ratio. The information about decimation pattern that is specified with image data format and reduction ratio may be output pattern regarding Y counter value and output UV component by each YUV format and each reduction ratio that will be described referring to FIG. 9, and so on.

The decimation pattern information storing unit 140 selects and outputs the decimation pattern information 142 based on image data format information set in the format information setting register 164, and reduction ratio information set in the reduction ratio setting register 162.

A valid data determining unit 120 may be provided in the output control signal generating circuit 190, and the output control signal 122 may be generated based on the YUV discriminated information 152 output from the YUV determining unit 150, the Y count value 132 output from the Y counter, and the decimation pattern information 142 output from decimation pattern information storing unit 140.

Figure 3:
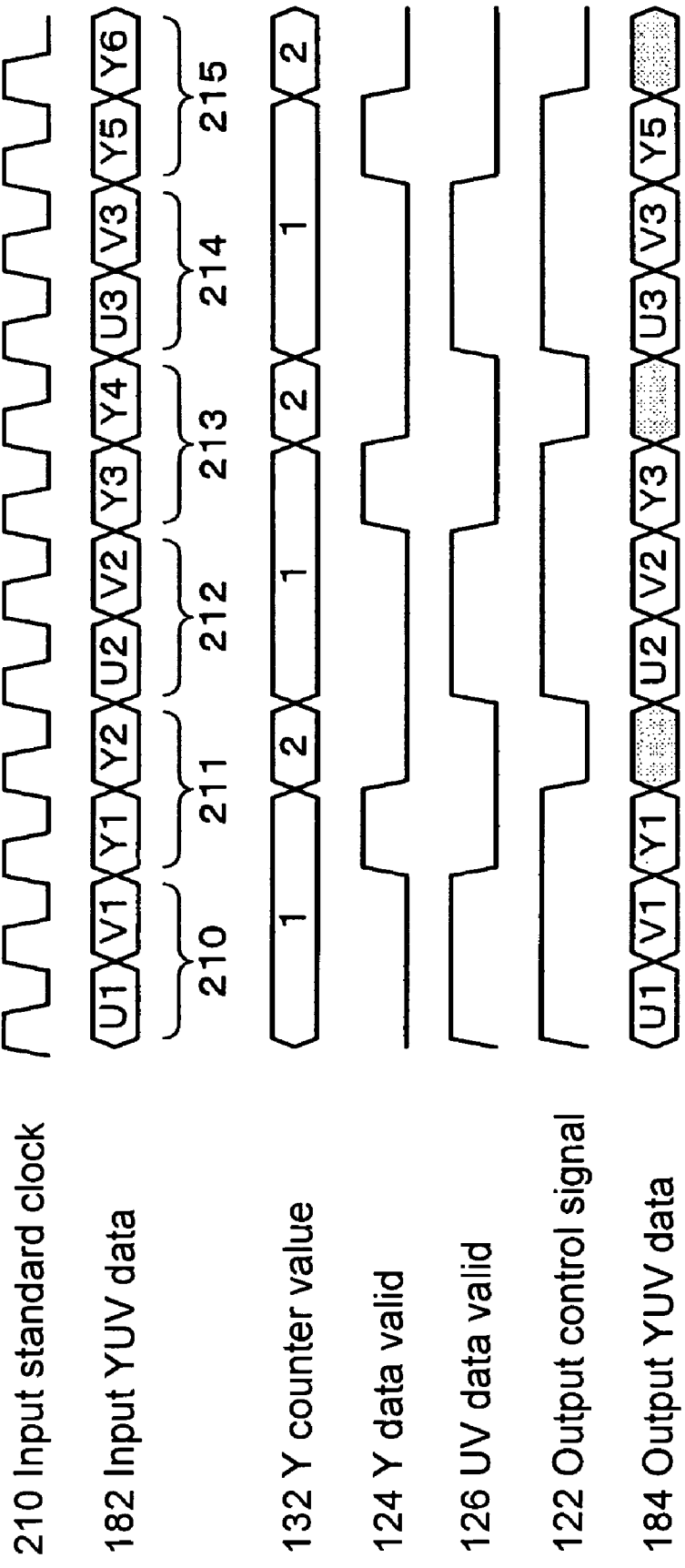
FIG. 3 is a timing chart diagram for the case where image data format information is YUV4:2:2, and reduction ratio is 1/2.

FIG. 3 is a timing chart diagram for the case where image data format information is YUV 4:2:2, and reduction ratio is 1/2. Reference 210 indicates input standard clock 210 synchronized with the input YUV data 182 input to an image data reducing device.

The Y counter value 132 is the value counted by the counting circuit. Here, the counted value is reset at 2, which is the reciprocal number of reduction ratio 1/2, and the counting restarts from count 1. Y data valid 124 is a signal determining whether Y data is one that is not decimated but output, or not, and becomes an H level if the Y data is valid one.

UV data valid 126 is a signal determining whether UV data is one that is not decimated but output, or not, and becomes an H level if the UV data is valid one. In the case where image data format information is YUV4:2:2, and reduction ratio is 1/2, input UV data is necessarily output as described referring to FIG. 1. With respect to input UV data, therefore, the UV data valid 126 is inevitably at an H level.

Here, component of current input data is unambiguously determined depending on input YUV format. Since the component is notified with the YUV discriminated information 152 of FIG. 2, in the case where the YUV discriminated information 152 indicates that input data is UV data, the valid data determining unit 120 makes the UV data valid 126 be at an H level.

In FIG. 3, therefore, the UV data valid 126 for the case where the input YUV data 182 is UV component (210, 212, and 214) is at an H level.

Meanwhile, input Y data is output only in the case of a representative point. The representative point is a value regarding at which value of the Y counter data is output. For example, as a method of extracting a representative point when decimation-compressing, a value obtained by adding 1 to the reciprocal number of reduction ratio, and then dividing the resultant number by 2, and thereafter rounding the resultant number down or up after the decimal point, may be used. Otherwise, a certain value among from 1 to the reciprocal number of reduction ratio may be used.

In FIG. 3, since reduction ratio is 1/2, the representative point is 1, which is obtained by adding 1 to 2, which is the reciprocal number, and then dividing the resultant number by 2, and thereafter rounding the resultant number down after the decimal point.

In the case where image data format information is YUV4:2:2, and reduction ratio is 1/2, Y data is necessarily output when Y counter value is 1. Thus, when input data is Y component and Y counter value is 1, the Y data valid is at an H level. In the case where the YUV discriminated information 152 indicates that input data is Y data, and the Y counter value is 1, the valid data determining unit 120 makes the Y data valid 124 be at an H level.

In FIG. 3, therefore, the Y data valid 124 for the case where the input YUV data 182 is Y component (211, 213, and 215), and the Y counter value is 1, is at an H level.

In the case where either the Y data valid 124 or the UV data valid 126 is at an H level, the valid data determining unit 120 controls so that the output control signal 122 becomes an H level.

In the case where the output control signal 122 is at an H level, the output data generating unit 110 of FIG. 2 turns on a switch for controlling the presence of output of input YUV data so as to output the input data as the output YUV data 184.

In the case where the output control signal 122 is at an L level, the output data generating unit 110 turns off a switch for controlling the presence of output of input YUV data so as not to output the input data as the output YUV data 184.

Thus, reduction of image data by data decimation can be realized by controlling ON and OFF of the switch in the output data generating unit 110 based on the output control signal.

Figure 4:
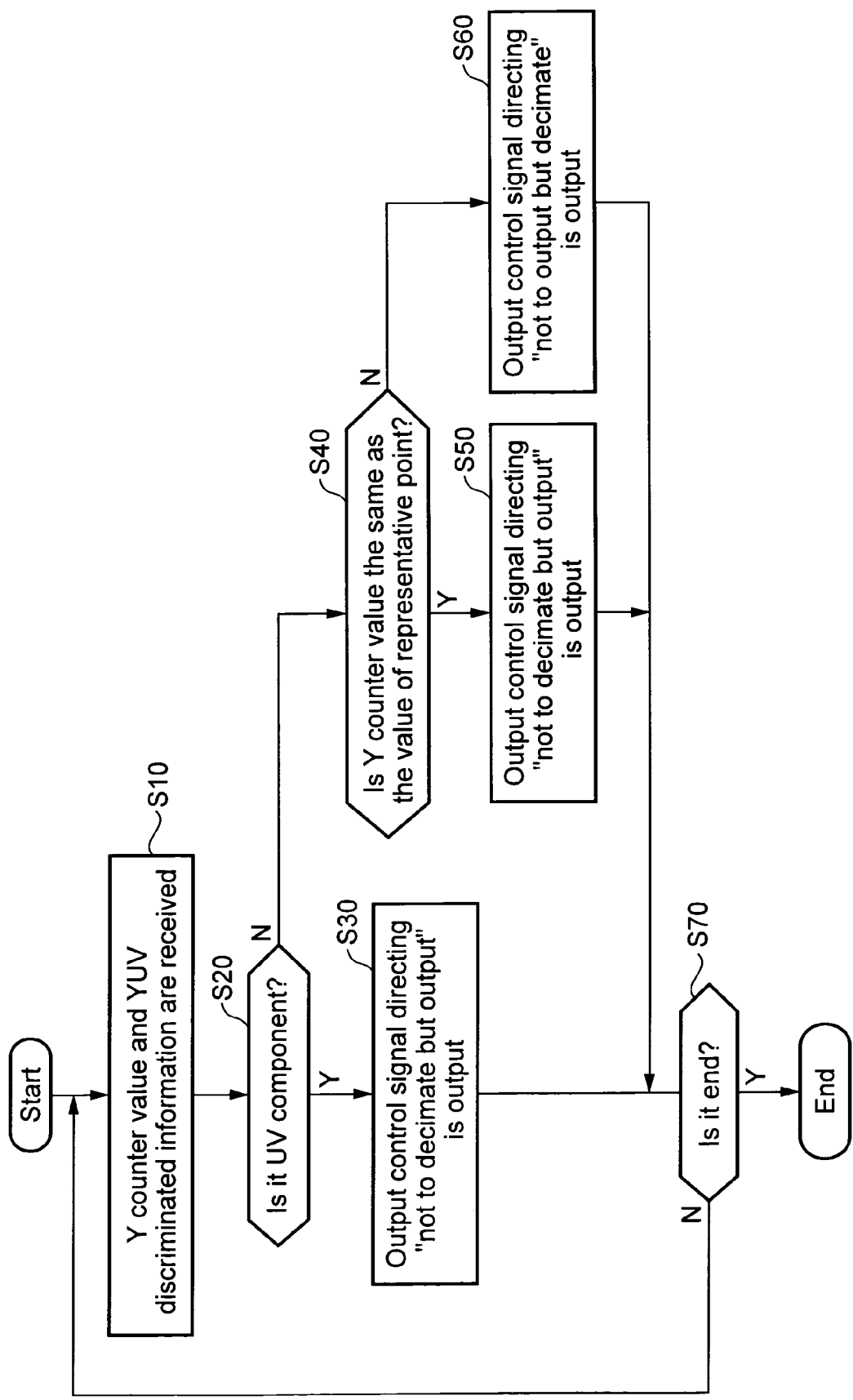
FIG. 4 is a flow chart diagram for explaining processing of generating an output control signal for the case where image data format information is YUV4:2:2, and reduction ratio is 1/2.

FIG. 4 is a flow chart diagram for explaining the processing of generating the output control signal for the case where image data format information is YUV4:2:2, and reduction ratio is 1/2.

First, the Y counter value and the YUV discriminated information are received (step S10). Then, whether component is UV component or not is determined based on the YUV discriminated information. If the component is UV component, an output control signal directing "not to decimate but output" (for example, output control signal at an H level) is output (steps S20 and S30).

If the component is not UV component (is Y component), whether the Y counter value is the same as the value of a representative point or not is determined. If it is the same, an output control signal directing "not to decimate but output" (for example, output control signal at an H level) is output (steps S40 and S50).

If the Y counter value is not the same as the value of the representative point, an output control signal directing "not to output but decimate" (for example, output control signal at an L level) is output (steps S40 and S60).

Figure 5A:
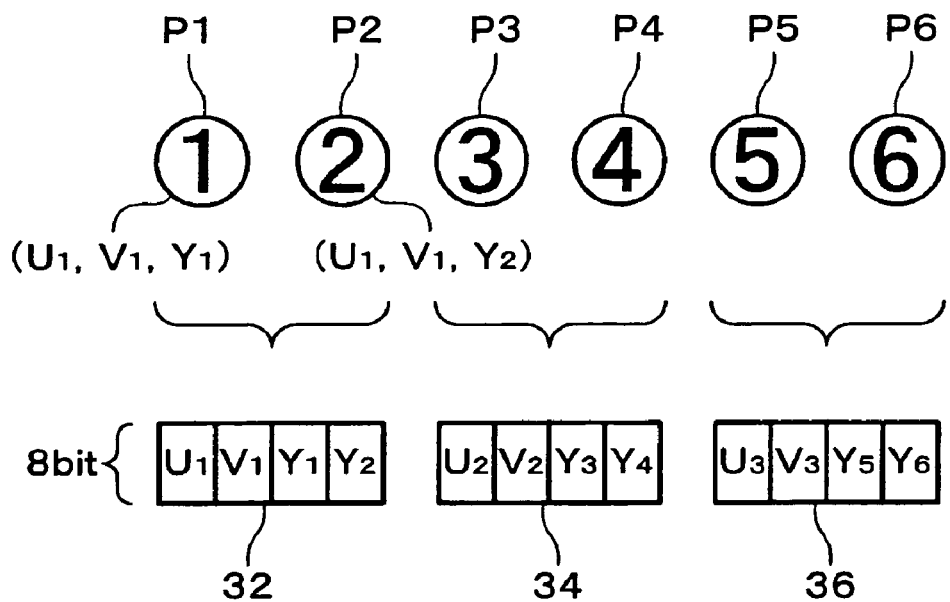
FIGS. 5 (A) and (B) are diagrams for explaining an example of 1/3 reduction of image data having a format of YUV4:2:2.
Figure 5B:
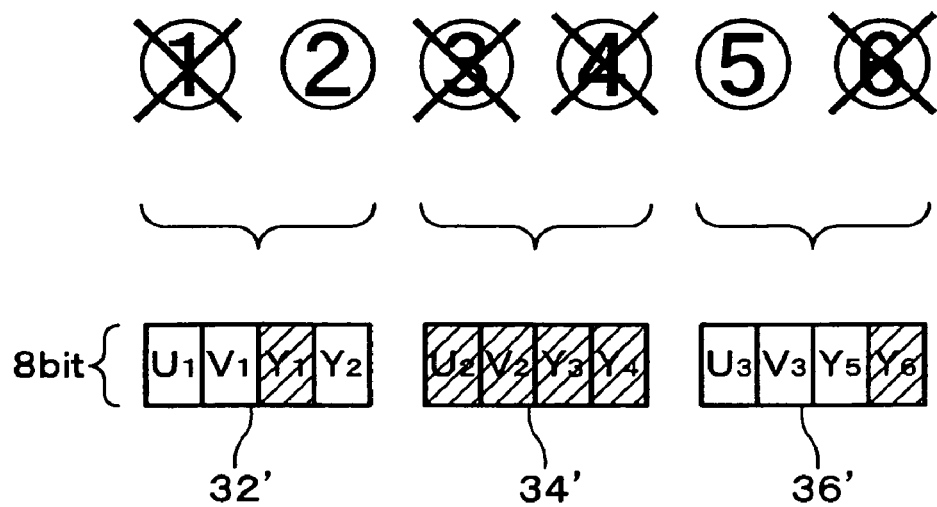

FIGS. 5 (A) and (B) are diagrams for explaining an example of ⅓ reduction of image data having a format of YUV4:2:2. Here, it is assumed that YUV format after reduction is 4:4:4.

References P1 through P6 of FIG. 5 (A) indicate each pixel corresponding to image data input to an image data reducing device of the present embodiment. Reference 32 indicates the configuration of image data for the pixels P1 and P2, reference 34 that of image data for the pixels P3 and P4, and reference 36 that of image data for the pixels P5 and P6.

In the case of image data having a format of YUV4:2:2, when the image data 32 for the pixels P1 and P2 is (U1, V1, Y1, Y2), image data for P1 is (U1, V1, Y1) and image data for P2 is (U1, V1, Y2). As described, in the case of YUV4:2:2, Y component has data corresponding one-to-one to each pixel, and UV component is shared by the adjacent two pixels. It is assumed that each component data is represented by 8 bit.

FIG. 5 (B) is a diagram for explaining data decimation for the case of implementing ⅓ reduction for input image data. The ⅓ reduction means that ⅓ of pixels data is input are left and the remaining ⅔ thereof are decimated. Here, shown is the state where the pixels P1, P3, P4, and P6 are decimated, while the pixels P2 and P5 are left. In this case, the image data after reduced corresponding to the pixels are indicated with references 32', 34', 36', and so on. Namely, components shown as a hatched area are decimated. For example, in reference 32', data (U1, V1, Y2) for the pixel P2 remaining after reduction is left, and data Y1 for the pixel P1 eliminated after reduction is decimated. Meanwhile, both of the pixels P3 and P4 of reference 34' are decimated such that data (U2, V2, Y3, Y4) corresponding to P3 and P4 are all decimated.

In the case of ⅓ reduction of image data having a format of YUV4:2:2, the whole decimation pattern is the repetition of the decimation patterns shown by references 32', 34', and 36' of six pixels P1 through P6 as a bunch. Namely, with respect to Y component, data is output if reminder obtained by dividing n of Yn by 3 is equal to the value of a representative point (here, 2, since the value of a representative point is defined as 2), and data is decimated in the other case. Meanwhile, with respect to UV component, data is output if reminder obtained by dividing n of Un (or Vn) by 3 is equal to 1 or 3, and data is decimated if the reminder is 2 (decimation pattern for the case of ⅓ reduction of image data having a format of YUV4:2:2).

The above decimation pattern can also be defined as being related to Y counter value. Namely, with respect to Y component, data is output if Y counter value is equal to the value of a representative point (here, 2, since the value of a representative point is defined as 2), and data is decimated in the other case. Meanwhile, with respect to UV component, data is output if the Y counter value is 1 or 3, and decimated if the value is 2 (decimation pattern related to Y counter value for the case of ⅓ reduction of image data having a format of YUV4:2:2).

FIG. 6 is a timing chart diagram for the case where image data format information is YUV4:2:2, and reduction ratio is 1/3. Reference 210 indicates the input standard clock 210 synchronized with the input YUV data 182 input to an image data reducing device.

The Y counter value 132 is the value counted by the counting circuit. Here, the counted value is reset at 3, which is the reciprocal number of reduction ratio 1/3, and the counting restarts from count 1.

The Y data valid 124 is a signal determining whether Y data is one that is not decimated but output, or not, and becomes an H level if the Y data is valid one.

The UV data valid 126 is a signal determining whether UV data is one that is not decimated but output, or not, and becomes an H level if the UV data is valid one.

In the case where image data format information is YUV4:2:2, and reduction ratio is 1/3, input UV data is output when the Y counter value is 1 or 3, and decimated if the value is 2, as described referring to FIG. 5. Here, component of current input data is unambiguously determined depending on input YUV format. Since the component is notified with the YUV discriminated information 152 of FIG. 2, in the case where the YUV discriminated information 152 indicates that input data is UV data, and the Y counter value is 1 or 3, the valid data determining unit 120 makes the UV data valid 126 be at an H level. In FIG. 6, therefore, the UV data valid 126 becomes an H level with respect to the UV data of references 220, 224, and 226, and the UV data valid 126 becomes an L level with respect to the UV data of reference 222.

Meanwhile, input Y data is output only in the case of a representative point. Here, since reduction ratio is 1/3, the representative point is 2, which is obtained by adding 1 to 3, which is the reciprocal number, and then dividing the resultant number by 2, and thereafter rounding down the resultant number after the decimal point.

In the case where image data format information is YUV4:2:2, and reduction ratio is 1/3, Y component is output when Y counter value is 2. Thus, when input data is Y component and Y counter value is 2, the Y data valid is at an H level. Specifically, in the case where the YUV discriminated information 152 indicates that input data is Y data, and the Y counter value is 2, the valid data determining unit 120 makes the Y data valid 124 be at an H level.

In FIG. 6, therefore, the Y data valid 124 for the case where the input YUV data 182 is Y component (221, 223, 225, and 227), and the Y counter value is 2, is at an H level.

In the case where either the Y data valid 124 or the UV data valid 126 is at an H level, the valid data determining unit 120 controls so that the output control signal 122 becomes an H level. Then, the input YUV data 182 corresponding to the case where the output control signal is at an H level becomes the output YUV data 184.

Figure 7A:
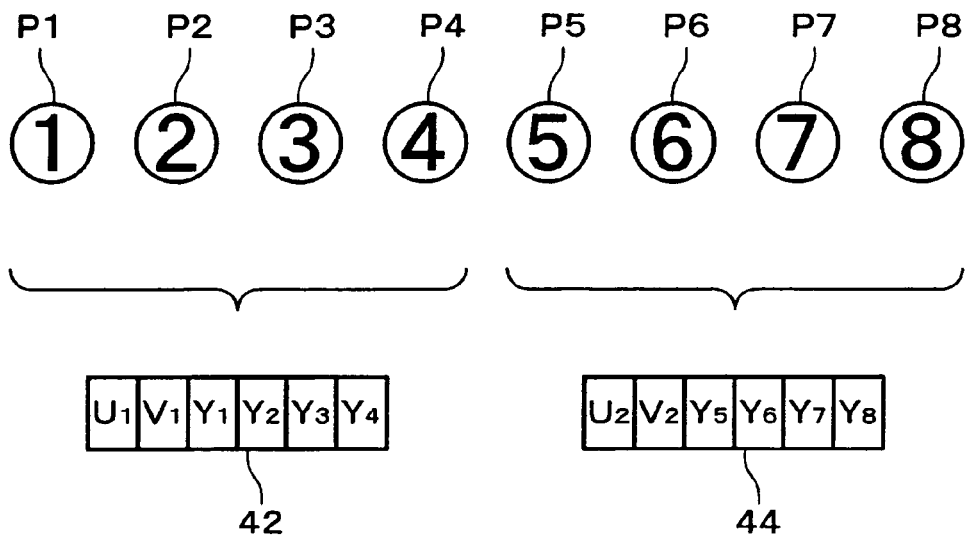
FIGS. 7 (A) and (B) are diagrams for explaining an example of 1/3 reduction of image data having a format of YUV4:1:1.
Figure 7B:
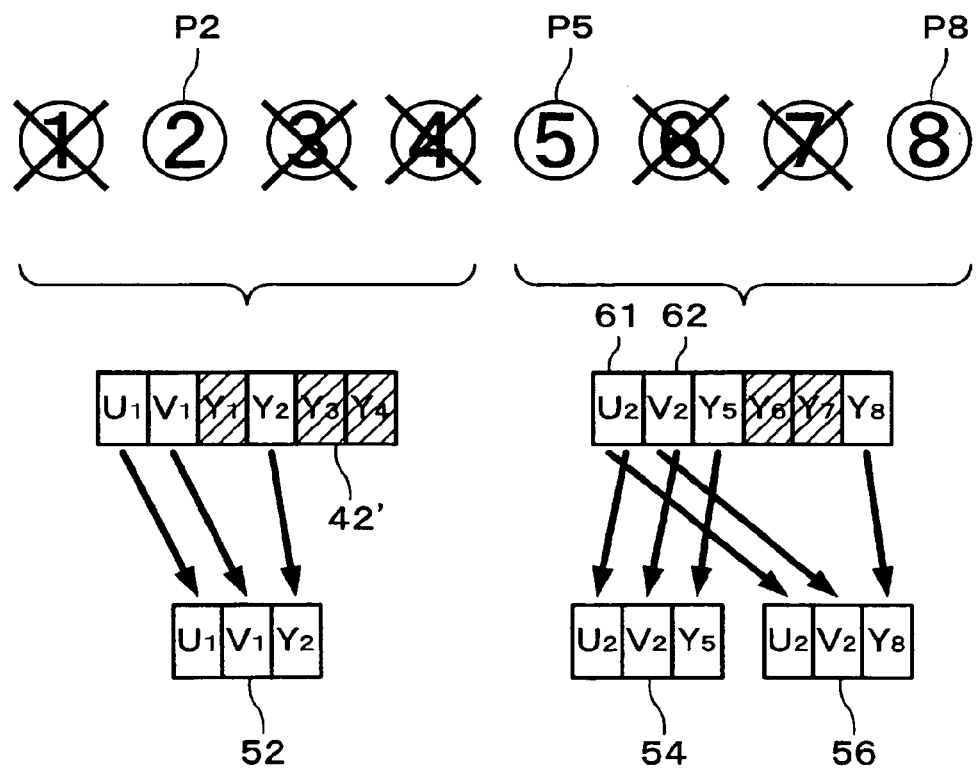

FIGS. 7 (A) and (B) are diagrams for explaining an example of ⅓ reduction of image data having a format of YUV4:1:1. Here, it is assumed that YUV format after reduction is 4:4:4.

References P1 through P8 of FIG. 7 (A) indicate each pixel corresponding to image data input to an image data reducing device of the exemplary embodiment. Reference 42 indicates the configuration of image data for the pixels P1 through P4, and reference 44 that of image data for the pixels P5 through P8.

In the case of image data having a format of YUV4:1:1, when the image data 42 for the pixels P1 through P4, for example, is (U1, V1, Y1, Y2, Y3, Y4), image data for P1 is (U1, V1, Y1), image data for P2 is (U1, V1, Y2), image data for P3 is (U1, V1, Y3), image data for P4 is (U1, V1, Y4). As described, in the case of YUV4:1:1, Y component has data corresponding one-to-one to each pixel, and UV component is shared by the adjacent four pixels. The data has a format where UV component is prior to Y component.

FIG. 7 (B) is a diagram for explaining data decimation for the case of implementing ⅓ reduction for input image data. The ⅓ reduction means that ⅓ of pixels data is input are left and the remaining ⅔ thereof are decimated. Here, shown is the state where the pixels P2, P5, and P8 are left, and the pixels P1, P3, P4, P6, and P7 are decimated.

In this case, the image data 52, 54, and 56 corresponding to the pixels P2, P5, and P8, which are not decimated in the reduction, needs be generated as image data after reduced. Here, the components U2 (61) and V2 (62) of the input YUV data 44 are used for both of the YUV image data 54 corresponding to the pixel P5 and the YUV image data 56 corresponding to the pixel P8. Accordingly, a circuit that stores UV data temporarily is provided (for example, the UV data storing unit 170 in FIG. 2), and YUV image data after reduced is generated using the stored data.

Figure 8:
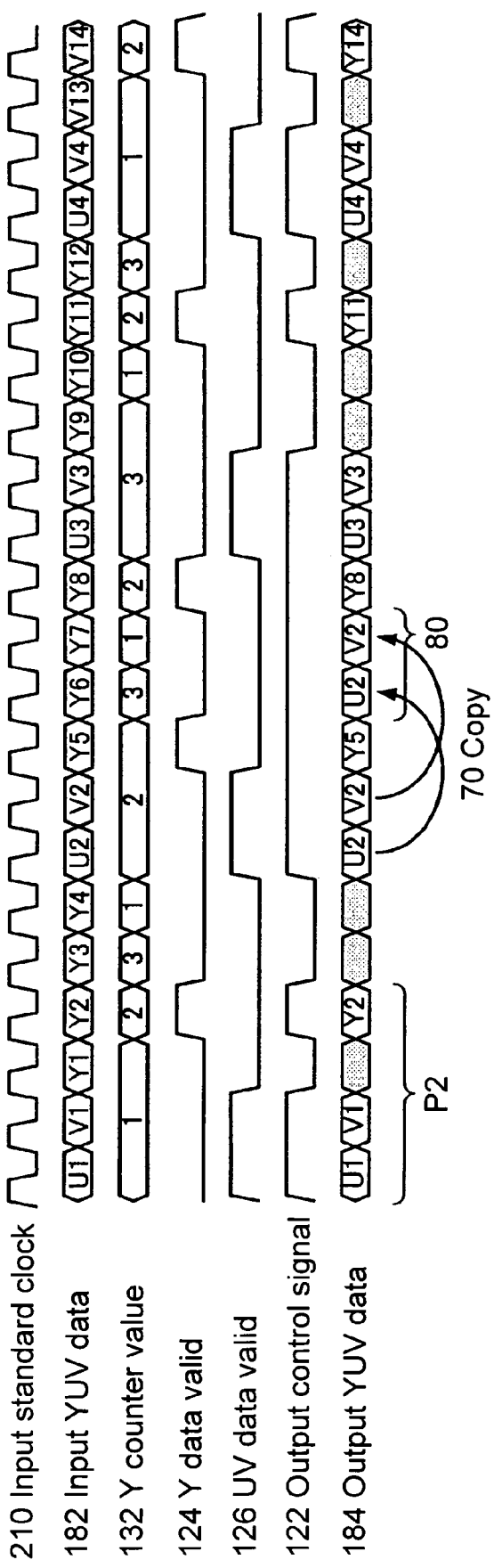
FIG. 8 is a timing chart diagram for the case where image data format information is YUV4:1:1, and reduction ratio is 1/3.

As described, the case where stored data is used may also be set as pattern information. As shown in FIG. 8, UV component is stored when Y counter value is 2 and used as UV of the next output. Note that the UV component is stored only when UV is input although UV may or may not be input while the Y counter is 2.

Furthermore, in the case of YUV 4:1:1, since the first and last Y data among 4 (four) Y data are used for pixels to be output (refer to 44' of FIG. 7 (B)), UV component that has been stored when data for intermediate two pixels (for example, Y6 and Y7 of 44 of FIG. 7 (B)) is input may be output.

In the case of 1/3 reduction of image data having a format of YUV4:1:1, the whole decimation pattern is the repetition of the decimation patterns for twelve pixels of P1 through P12 (refer to 60 of FIG. 8) as a bunch. Namely, with respect to Y component, data is output if reminder obtained by dividing n of Yn by 3 is equal to the value of a representative point (here, 2, since the value of a representative point is defined as 2), and data is decimated in the other case. With respect to UV component, all data is output. In the case where reminder obtained by dividing n of Un (or Vn) by 3 is 2, storing in a temporarily storing region is required, and YUV data corresponding to the next Y component is generated using stored UV component (decimation pattern for the case of 1/3 reduction of image data having a format of YUV4:1:1).

The above decimation pattern can also be defined as being related to Y counter value. Namely, with respect to Y component, data is output if Y counter value is equal to the value of a representative point (here, 2, since the value of a representative point is defined as 2), and data is decimated in the other case. With respect to UV component, all data is output regardless of the Y counter value. In the case where the Y counter value is 2, storing in a temporarily storing region is required, and YUV data corresponding to the next Y component is generated using stored UV component (decimation pattern related to Y counter value for the case of 1/3 reduction of image data having a format of YUV4:1:1).

FIG. 8 is a timing chart diagram for the case where image data format information is YUV4:1:1, and reduction ratio is 1/3. Reference 210 indicates the input standard clock 210 synchronized with the input YUV data 182 input to an image data reducing device.

The Y counter value 132 is the value counted by the counting circuit. Here, the counted value is reset at 3, which is the reciprocal number of reduction ratio 1/3, and the counting restarts from count 1.

The Y data valid 124 is a signal determining whether Y data is one that is not decimated but output, or not, and becomes an H level if the Y data is valid one.

The UV data valid 126 is a signal determining whether UV data is one that is not decimated but output, or not, and becomes an H level if the UV data is valid one.

In the case where image data format information is YUV4:1:1, and reduction ratio is 1/3, as described referring to FIG. 7, input UV data is all output, and UV data is stored in a temporarily storing region (for example, the UV data storing unit 170 of FIG. 2) when Y counter value is 2 so as to be reused in generating of YUV data corresponding to the next Y component. Thus, when input data is UV component (when YUV discriminated information of FIG. 2 indicates that data is UV component), the UV data valid is at an H level.

Meanwhile, with respect to input Y data, the Y data valid is at an H level when Y counter value is 2.

In FIG. 8, therefore, the Y data valid 124 for the case where the input YUV data 182 is Y component (221, 223, 225, and 227), and the Y counter value is 2, is at an H level.

In the case where either the Y data valid 124 or the UV data valid 126 is at an H level, the valid data determining unit 120 controls so that an output control signal becomes an H level. Furthermore, it controls so that an output control signal becomes an H level during a period 80 when UV component stored in a temporarily storing region (for example, the UV data storing unit 170 of FIG. 2) is output.

Then, the input YUV data 182 corresponding to the case where an output control signal is at an H level and UV component stored in a temporarily storing region (for example, the UV data storing unit 170 of FIG. 2), are output as the output YUV data 184.

FIG. 9 is a diagram showing an output pattern regarding Y counter value and output UV component by each YUV format and each reduction ratio. Here, Y component is output when Y counter value is equal to a representative point. In the case of a YUV4:4:4 format, UV component is output when Y component is output regardless of reduction ratio. Namely, UV component is output when Y counter value is equal to a representative point.

In the case of YUV4:2:2 format and reduction ratio 1/2, UV component is invariably output regardless of Y counter value.

In the case of YUV4:2:2 format and reduction ratio 1/3, UV component is output when Y counter value is 1 or 2.

In the case of YUV4:2:2 format and reduction ratio 1/4, UV component is output when Y counter value is 1.

In the case of YUV4:2:2 format and reduction ratio 1/5, UV component is output when Y counter value is 2 or 3.

In the case of YUV4:2:2 format and reduction ratio 1/6, UV component is output when Y counter value is 3.

In the case of YUV4:2:2 format and reduction ratio 1/7, UV component is output when Y counter value is 3 or 4.

In the case of YUV4:2:2 format and reduction ratio 1/8, UV component is output when Y counter value is 3.

In the case of YUV4:1:1 format and reduction ratio 1/2, UV component is invariably output regardless of Y counter value.

In the case of YUV4:1:1 format and reduction ratio 1/3, UV component is invariably output regardless of Y counter value.

In the case of YUV4:1:1 format and reduction ratio 1/4, U component is invariably output regardless of Y counter value.

In the case of YUV4:1:1 format and reduction ratio 1/5, UV component is output when Y counter value is not 4.

In the case of YUV4:1:1 format and reduction ratio 1/6, U component is output when Y counter value is not 5.

In the case of YUV4:1:1 format and reduction ratio 1/7, U component is output when Y counter value is 1, 2, 3, or 4.

In the case of YUV4:1:1 format and reduction ratio 1/8, v component is output when Y counter value is 1.

By previously setting such an output pattern, the presence of output for each component of YUV can be controlled with Y counter value if YUV format and reduction ratio are given.

The above output pattern may be set in a pattern information storing unit of FIG. 2 for example.

Figure 10:
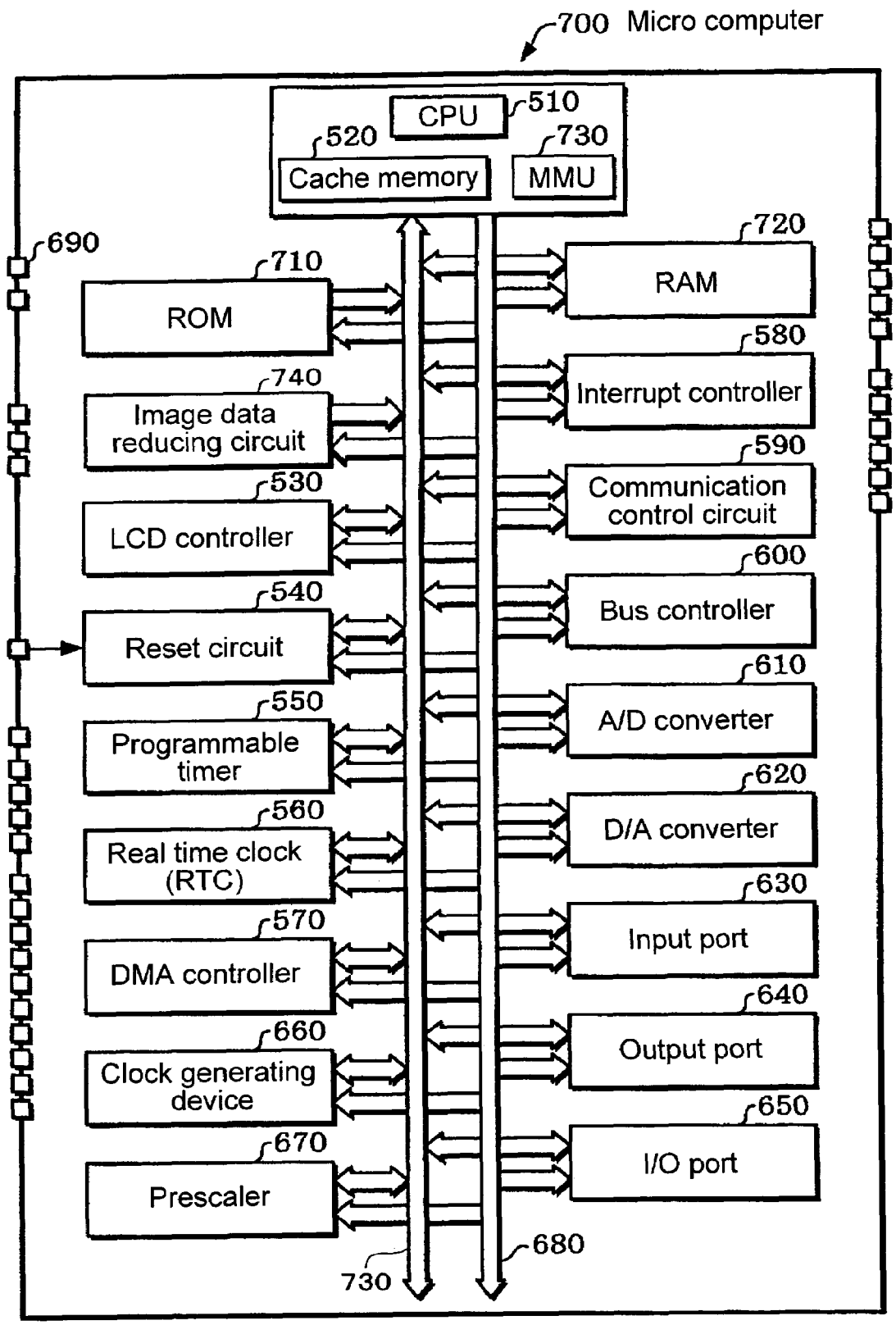
FIG. 10 shows one example of a hardware block diagram of a micro computer of an exemplary embodiment.

FIG. 10 shows one example of a hardware block diagram of an exemplary micro computer of the embodiment. A micro computer 700 can include a CPU 510, a cache memory 520, an LCD controller 530, a reset circuit 540, a programmable timer 550, a real time clock (RTC) 560, a DRAM controller and bus I/F 570, an interrupt controller 580, a communication control circuit 590, a bus controller 600, an A/D converter 610, a D/A converter 620, an input port 630, an output port 640, an I/O port 650, a clock generating device 660, a prescaler 670, and an image data reducing device 740. The micro computer 700 can also include a general-purpose bus 680, a dedicated bus 730, and various pins 690 and so on that interconnect the above elements.

The RAM 720 includes a DRAM functioning as a main storage and video memory. It also includes a DRAM or SRAM functioning as a common RAM. The image data reducing device 740 has the structure, for example, described referring to FIG. 2.

Figure 11:
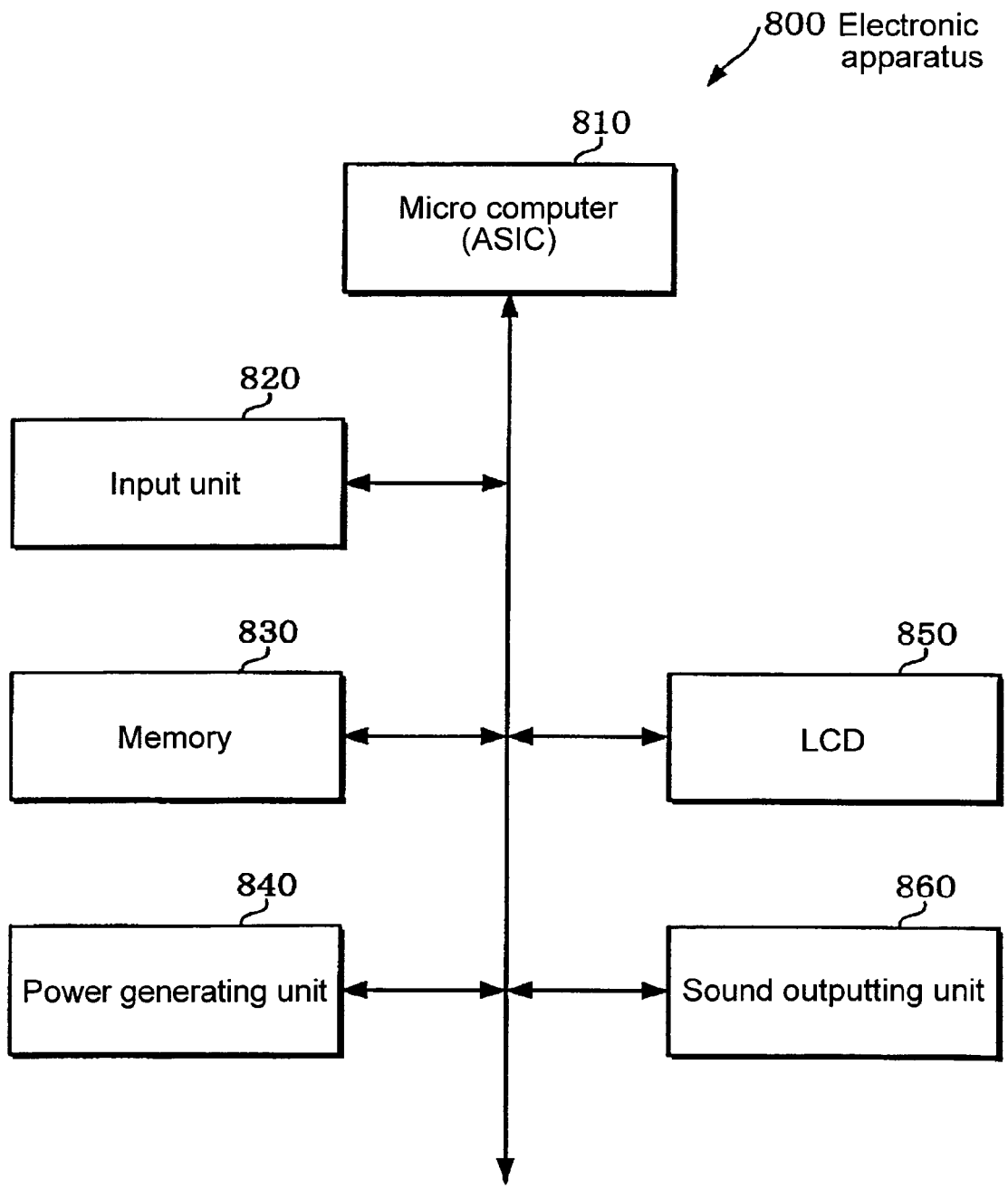
FIG. 11 shows an example of a block diagram of an electronic apparatus including the microcomputer.

FIG. 11 shows an example of a block diagram of an electronic apparatus of the embodiment. An electronic apparatus 800 can include a micro computer (or ASIC) 810, an input unit 820, a memory 830, a power generating unit 840, an LCD 850, and a sound outputting unit 860.

The input unit 820 is a unit for inputting various data. The microcomputer 810 performs various processing based on data input with the input unit 820. The memory 830 functions as a work space for the microcomputer 810 and so on. The power generating unit 840 generates various power used in the electronic apparatus 800. The LCD 850 outputs various images (character, icon, graphics and so on) shown by the electronic apparatus. The sound outputting unit 860 outputs various sound (audio, game sound, etc.) output from the electronic apparatus 800. The function thereof is realized by way of hardware such as a speaker.

Figure 12A:
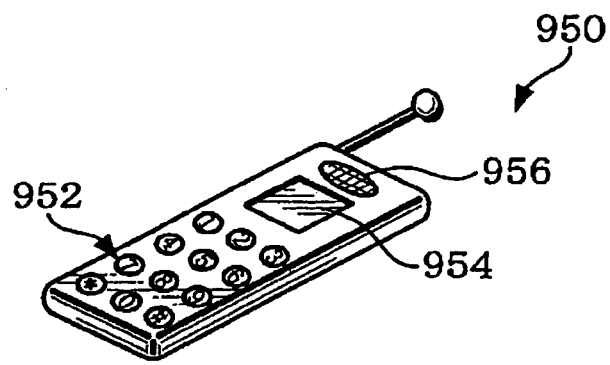
FIGS. 12 (A) through (C) show an example of an external view of various electronic apparatuses.
Figure 12B:
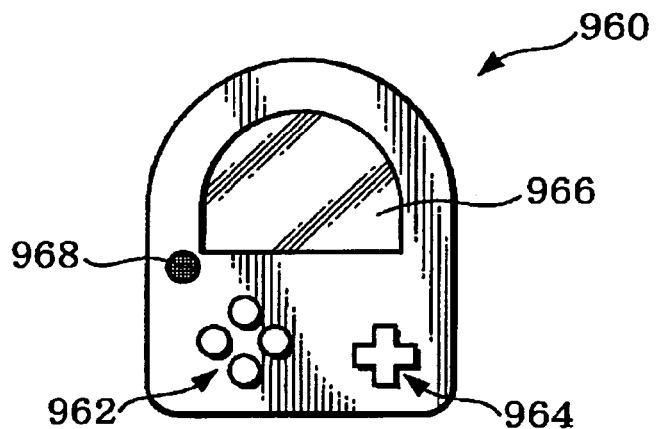
Figure 12C:
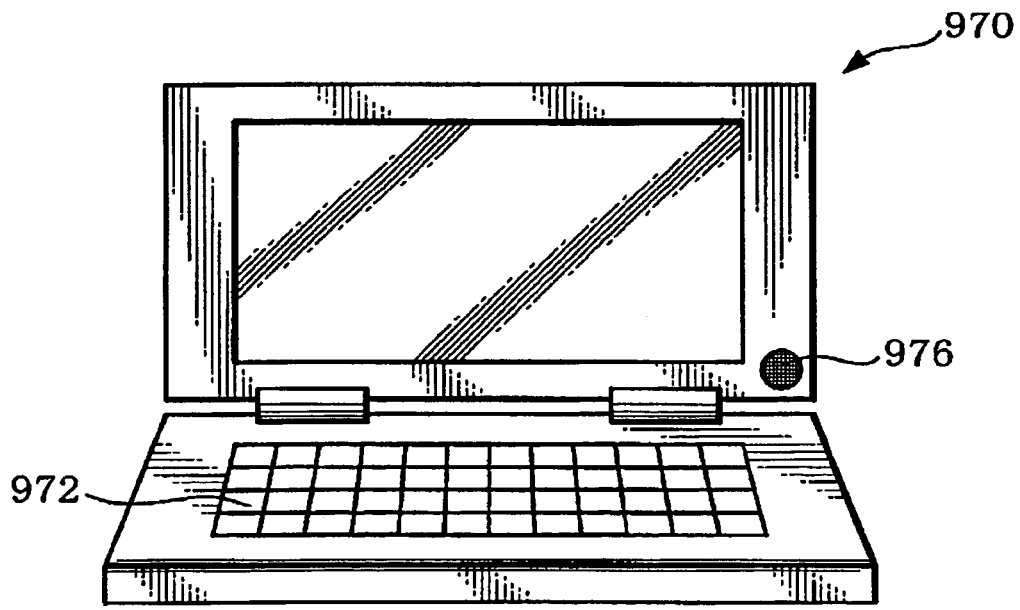

FIG. 12 (A) shows an example of an external view of a cellular phone 950, which is one of electronic apparatuses. The cellular phone 950 comprises a dial button 952 functioning as an input unit, an LCD 954 displaying a phone number, a name, an icon, etc., and a speaker 956 that functions as a sound outputting unit and outputs sounds.

FIG. 12 (B) shows an example of an external view of a portable game device 960, which is one of electronic apparatuses. The portable game device 960 can include operation buttons 962, a cross key 964 that function as an input unit, an LCD 966 displaying game images, and a speaker 968 that functions as a sound outputting unit and outputs game sounds.

FIG. 12 (C) shows an example of an external view of a personal computer 970, which is one of electronic apparatuses. The personal computer 970 comprises a key board 972 functioning as an input unit, an LCD 974 displaying characters, figures, graphics, etc., and a sound outputting unit 976.

By incorporating the micro computer of the embodiment into the electronic apparatuses of FIGS. 12 (A) through (C), an electronic apparatus whose price is low and speed of image processing is high, and so whose cost performance is high can be provided.

In addition, other than apparatuses shown in FIGS. 12 (A) through (C), various electronic apparatuses using an LCD such as a portable information terminal, a pager, an electronic desktop calculator, a device having a touch panel, a projector, a word processor, a view finder type or monitoring type video tape recorder, a car navigation system, and the like may be contrived as an electronic apparatus utilizing the exemplary embodiment.

Here, it should be understood that the invention is not limited to the exemplary embodiment, but apply to various kinds of modifications within the scope and spirit of the invention.

The invention claimed is:

1. An image data reducing device for image data composed of a plurality of components, the image data having data corresponding one-to-one to each pixel with respect to a given component among the plurality of components, and having data common to a plurality of pixels with respect to the other components, the image data reducing device, comprising:
a reduced image data generating circuit that receives input image data, the input image data being configured such that data of each component of the plurality of components has a series relationship with each other, the reduced image data generating circuit generating reduced image data so as to output the reduced image data; and
an output control signal generating circuit that generates an output control signal that controls whether each component of the input image data is output or not based on a decimation pattern that is determined depending on a format of the input image data and a reduction ratio, the reduced image data generating circuit including a switching circuit that controls a presence of output for each component of the input image data being input in series based on the output control signal.

2. The image data reducing device according to claim 1, the output control signal generating circuit further comprising:
a counting circuit that counts input of the given component, the counting circuit resetting a counted value in a case where the counted value reaches a reciprocal number of the reduction ratio so as to restart counting, based on information about the format of the input image data and information about the reduction ratio; and
a decimation pattern information storing unit that stores decimation pattern information set in correlation with the counted value of the given component, the output control signal being generated based on the counted value of the given component and the decimation pattern information.

3. The image data reducing device according to claim 1, input data being received as parallel data with bandwidth equal to a bit number of each component; and
the reduced image data generating circuit controlling a presence of output for each bit of the parallel data base on the output control signal.

4. The image data reducing device according to claim 1, a reduction ratio setting register setting reduction ratio information being included; and
reduction ratio being determined based on the reduction ratio information set in the reduction ratio setting register.

5. The image data reducing device according to claim 1, a format information setting register setting format information of input image data being included; and
a format of input image data being determined based on the format information set in the format information setting register.

6. A micro computer comprising the image data reducing device according to claim 1.

7. An electronic apparatus, comprising:
the micro computer according to claim 6;
an input device that inputs data to be processed by the micro computer; and
LCD output device that displays data that has been processed by the micro computer.

8. An image data reducing device reducing YUV image data, comprising:
a reduced image data generating circuit that receives input YUV image data, the input YUV image data being configured such that data of each component of YUV has a series relationship with each other, the reduced image data generating circuit generating reduced YUV image data so as to output the reduced YUV image data; and
an output control signal generating circuit that generates an output control signal that controls whether each component of the input YUV image data is output or not based on a decimation pattern of input component that is determined depending on a format of the input YUV image data and a reduction ratio,
the reduced image data generating circuit including a switching circuit that controls a presence of output for each component of the input YUV image data being input in series based on the output control signal,
the output control signal generating circuit including:
a counting circuit that counts input of Y component, the counting circuit resetting counted value in the case where the counted value of Y component reaches a reciprocal number of the reduction ratio so as to restart counting, based on information about the format of the input YUV image data and information about the reduction ratio; and a decimation pattern information storing unit that stores decimation pattern information set in correlation with the counted value of Y component; and the output control signal being generated based on the counted value of the Y component and the decimation pattern information.

9. The image data reducing device according to claim 8, the reduced image data generating circuit including a common data storing unit that retains the other components or UV component that is input and has data common to a plurality of pixels, the reduced image data generating circuit generating reduced image data by using data stored in the common data storing unit based on the output control signal; and the output control signal generating circuit that determines whether reduced image data is generated by using data stored in the common data storing unit or not, based on the counted value of the Y component and the decimation pattern information, the output control signal generating circuit generating the output control signal directing to generate reduced image data by using data stored in the common data storing unit in a case where generating of reduced image data by using data stored in the common data storing unit is determined.

* * * * *

UNITED STATES PATENT AND TRADEMARK OFFICE
CERTIFICATE OF CORRECTION

PATENT NO. : 7,394,487 B2
APPLICATION NO. : 10/802938
DATED : July 1, 2008
INVENTOR(S) : Hidetaka Kaji It is certified that error appears in the above-identified patent and that said Letters Patent is hereby corrected as shown below:

Title Page, Insert:

(30)        Foreign Application Priority Data

Mar. 28, 2003    (JP) ............................ 2003-091715

Signed and Sealed this

Second Day of December, 2008

JON W. DUDAS
*Director of the United States Patent and Trademark Office*